Oct. 6, 1942. E. C. RANEY 2,298,163
CONTROL APPARATUS
Filed May 29, 1940 3 Sheets-Sheet 2

INVENTOR
Estel C. Raney
BY
Warren H. F. Schmeding
ATTORNEY

Oct. 6, 1942. E. C. RANEY 2,298,163
CONTROL APPARATUS
Filed May 29, 1940 3 Sheets-Sheet 3

INVENTOR
Estel C. Raney
BY
ATTORNEY

Patented Oct. 6, 1942

2,298,163

UNITED STATES PATENT OFFICE

2,298,163

CONTROL APPARATUS

Estel C. Raney, Columbus, Ohio, assignor to Ranco Incorporated, Columbus, Ohio, a corporation of Ohio Application May 29, 1940, Serial No. 337,850

7 Claims. (Cl. 237—2)

The present invention relates to thermostatic control apparatus and more particularly to apparatus for controlling the rate of heat exchange between a heat interchanger and a medium passing over the interchanger.

Passenger compartments of closed automobiles are often heated by directing outside air over a heat interchanger and into the compartment. In order to maintain the average temperature of the air in the passenger compartment substantially constant while the temperature of the outside air varies, it is desirable to automatically regulate the heat interchanger to maintain a comfortable temperature in all parts of the compartment and also to prevent cold air from discharging into the compartment from the interchanger even though the temperature of the compartment is normal.

One of the objects of the present invention is to control the rate of heat exchange between the heat interchanger and air by a device including a thermal element that is positioned adjacent an outer uninsulated wall of the passenger compartment, for example, the windshield. Thus the element will be readily affected by changes in the outside temperature and also by the temperature of the air in the compartment so that as the temperature of the outside air varies, the rate of heat exchange between the interchanger and air will vary substantially simultaneously with the variations in outside temperature to maintain a substantially uniform temperature of the air entering the compartment.

Another object of the invention is to place the thermal element adjacent the windshield of the automobile and between two warm air outlets that directs warm air upwardly on the windshield.

It is common practice to install a radio on the forward side of an instrument panel secured below the windshield of an automobile. Another object of the invention is to direct outside air through the radio to carry away heat generated by the radio so that the thermal element may be mounted on the panel above the radio without being affected by the operation of the latter.

Other and further objects and advantages will be apparent from the following description, reference being had to the accompanying drawings wherein a preferred form of embodiment of the present invention is clearly shown.

Figure 1:
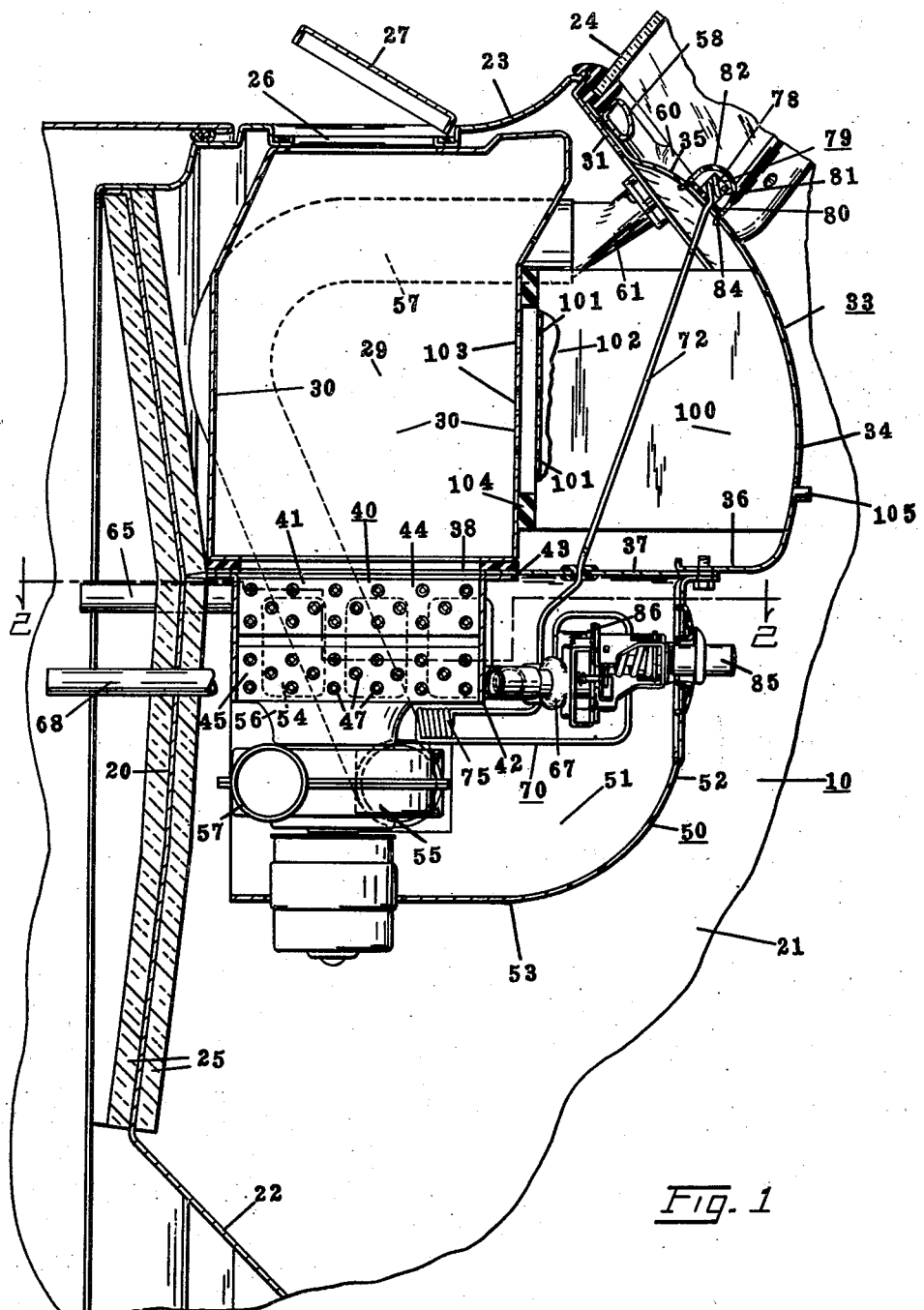
Fig. 1 is a fragmentary view, partially in section, of the forward end of a closable passenger compartment of an automobile, showing a heat interchanger and a controller therefor, which heat interchanger warms outside air that is directed into the compartment.
Figure 2:
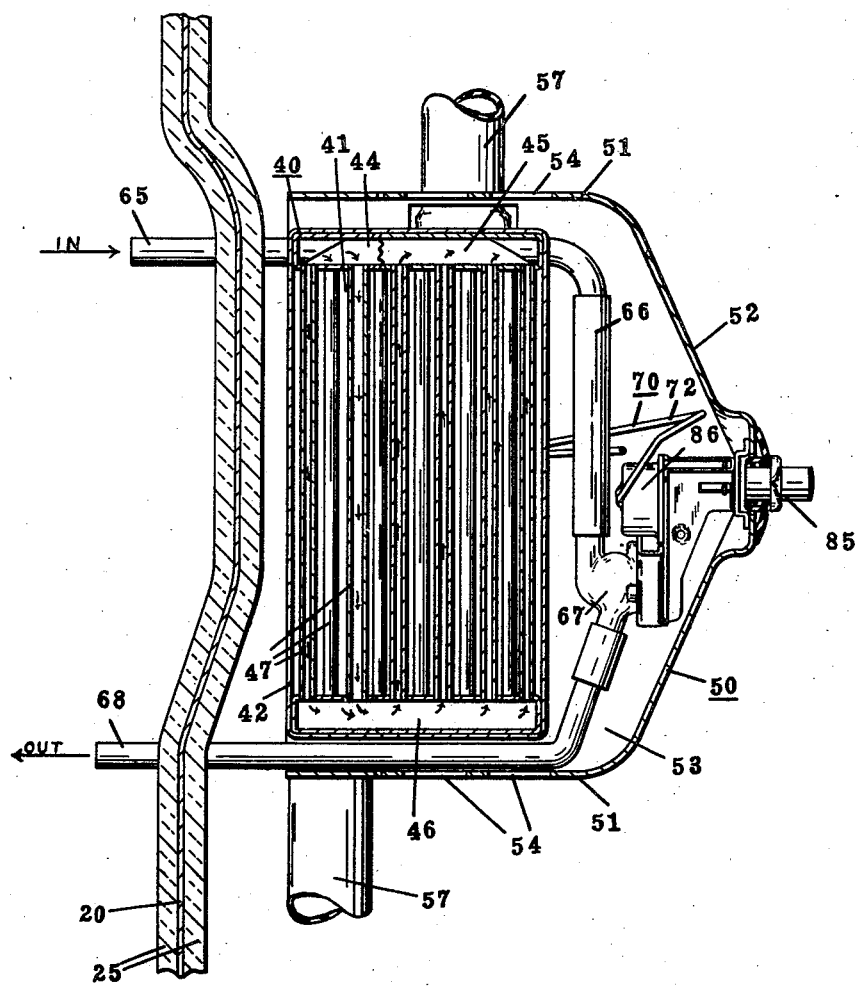
Fig. 2 is a sectional view taken on line 2—2 of Fig. 1.

Referring to the drawings, the closable passenger compartment is formed by the usual walls, doors, and windows and the forward part 10 thereof is shown in detail including a front wall 20, side walls 21, floor 22, cowl 23 and a windshield 24. Both sides of wall 20 are covered by insulating material 25. An opening 26 is provided in the cowl, which opening may be closed by a cover 27 that is hinged at its rear edge in such a manner that the cover may be tilted upwardly as shown in Fig. 1, by suitable tilting mechanism. The tilting mechanism within the ready reach of the occupant on the front seat of the passenger compartment is not shown because such mechanism is well known. Thus the cover 27 directs outside air into the opening 26 when the automobile is in forward motion.

A rectangular duct 29, formed by sheet metal walls 30, is secured under the cowl and in alignment with the opening 26 for directing air entering the opening downwardly to a heat interchanger 40.

A panel 33 extends transversely of the compartment directly beneath the windshield 24. This panel is secured at either end to the side walls 21 of the compartment and the top thereof is attached to an apron 31 extending from the cowl. The central portion 34 of the panel is substantially vertical and the various well known instruments of the automobile, not shown, may be mounted thereon. The upper portion of the panel 33 is curevd forwardly to form a ledge 35 adjacent the lower edge of the windshield. The lower edge of the panel 33 extends forwardly as at 36. One end of a plate 37 is secured to the portion 36 of the panel 33 and the opposite end of the plate 37 is attached to the lower end of the duct 29. An opening 38 is formed in the plate 37, which opening is in alignment with the lower open end of the duct 29.

The heat interchanger 40 is mounted on the plate 37 in registration with the opening 38. The heat interchanger 40, may be of any suitable form and in the present embodiment of the invention, it is in the form of a radiator 41 through which hot liquid of the cooling system of the automobile engine is circulated and over which air is passed to absorb the heat from the circulating liquid. The radiator 41 is surrounded by a shell 42 and comprises an upper header 44 and a lower header 45 at one end of the shell and a header 46 at the opposite end. The headers are attached to the walls of the shell 42 as by brazing or welding. A plurality of copper tubes 47 interconnect the header 44 with the upper portion of header 46 and a plurality of similar tubes interconnect the header 45 with the lower portion of the header 46. The tubes 47 are preferably disposed in staggered relation with one another to present a maximum tube surface to air passing through the radiator. The shell 42 encloses the sides of the radiator for directing air over the tubes 47. The upper edges of the shell 42 are provided with flanges 43, which flanges are attached to the plate 37.

A shroud 50, formed of side walls 51, an end wall 52 and a bottom wall 53 is attached to the portion 36 of the panel 33 and the plate 37. A plurality of openings 54 are formed in the side walls 51 of the shroud for discharging air sidewise. The end of the shroud adjacent the forward wall of the automobile compartment is open for the discharge of air.

Figure 3:
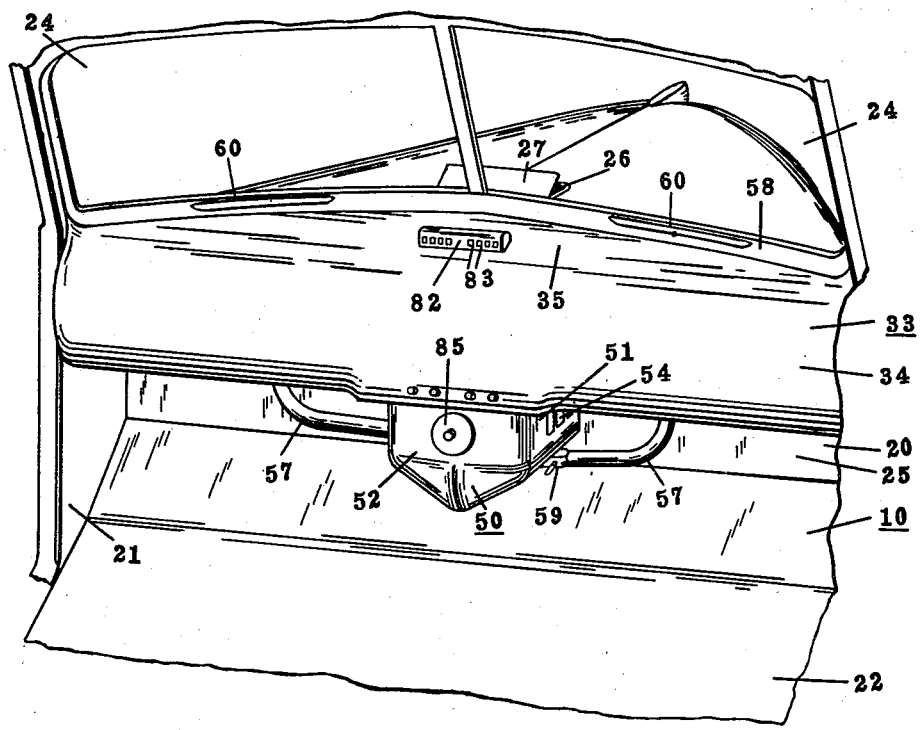
Fig. 3 is a fragmentary perspective view of the forward end of a closable automobile compartment, the steering column and driving control members being omitted.
Figure 4:
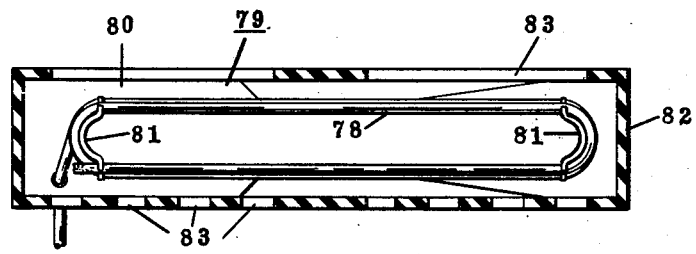
Fig. 4 is a view on an enlarged scale and partly in section, of a thermostatic system and shield for regulating a control mechanism for the interchanger, part of the system being shown broken away.
Figure 4:
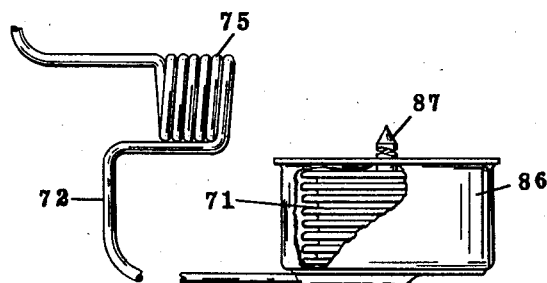

An electric motor driven sirocco type fan 55 is disposed within the shroud and directly beneath the radiator 41. The inlet of the fan is provided with a flared neck 56 that is in alignment with a portion of the air discharge of radiator 41. The fan 55 is adapted to force air discharged from the radiator through two ducts 57 that direct the air upwardly against the inside of the windshield. The outlets of the ducts are positioned at the center of each half of the windshield. The outlet of each of the ducts 57 is provided with a flared nozzle 61 which is attached to the underside of the apron 31. The panel and cowl are provided with openings through which the nozzles 61 extend. A tubular bead 58 is disposed along the lower edge of the windshield 24 and this bead is provided with lateral openings in registration with the nozzles 61, which openings are formed by piercing slots in the wall of the bead and bulging the material adjacent the slots upwardly, as at 60. The bulged material 60 directs the air passing through the slots upwardly against the windshield. Thus warm air may be directed against the inside of the windshield to prevent the collection of moisture thereon or "fogging" of the windshield. The passage of air through the ducts 57 may be controlled by dampers, one of which is shown at 59 in Fig. 3.

Hot liquid of the cooling system of the automobile engine is directed into the header 44 by the circulating pump of the cooling system, through a tube 65. The liquid is directed through the tubes 47 to the header 46 and thence to the header 45 and discharged from the header 45 through a tube 66 to a control mechanism which in the present embodiment of the invention consists of a thermostatically controlled throttling valve 67. The liquid flows from the valve 67 to the cooling system of the engine through a tube 68. The valve 67 is actuated by a thermostatic system 70 for regulating the flow of liquid through the radiator 41 and consequently the rate of heat exchange between the radiator and air passing therethrough. Preferably the valve 67 is mounted within the shroud 50 on the end wall 52 thereof. The valve and thermostatic system is similar to the valve and thermostatic system disclosed in the application of E. D. Raney and W. V. Hobbs, Serial Number 267,719, filed April 13, 1939.

The thermostatic system 70 comprises a bellows 71 and a tube 72, the tube having one end thereof connected with the bellows and the opposite end thereof closed. The bellows and tube 77 form a closed system. This system contains a thermally responsive fluid such as methyl chloride. The quantity of fluid in the system is such, for example, that when the system is at a temperature of 96 degrees F., the fluid will be completely vaporized and when any part of the system is below 96 degrees F. the vapor will commence to liquify in the coldest part of the system. The tube 72 is coiled at 75 and 78. These coils 75 and 78 serve as condensers and confine considerable sections of the tube to small areas so that a relatively large quantity of the fluid in the system will be subjected to the temperature of the air surrounding the coils. These coils may thus be referred to as thermostatic elements.

If the valve 67 were controlled by a thermostatic element subjected solely to the temperature of the air relatively remote from the outside uninsulated walls of the compartment, the temperature of the compartment could not be maintained constant during certain variations in the temperature of the outside air. This is explained by the fact that as the temperature of the outside air decreases, the quantity of liquid flowing through the radiator 41, per minute, to maintain a temperature of 70 degrees F. inside the compartment, must be increased proportionally. However, increased flow cannot occur until the temperature of the thermostatic element is lowered. This lowering of the temperature is objectionable.

I have found that by locating the thermostatic element adjacent an uninsulated wall of the compartment it is affected more readily by the temperature of the outside air and as the temperature of the outside air decreases, the temperature of the thermostatic element will be decreased below the average temperature in the compartment and cause an increase in the flow of liquid through the interchanger for maintaining the air discharging from the interchanger at a temperature sufficient to maintain the temperature in the compartment substantially constant. As the temperature of the outside air increases, the temperature of the thermostatic element increases and causes a reduction in the flow of heating liquid. Also if the air temperature in the compartment increases, the temperature of the thermostatic element will be raised, providing the outside temperature does not decrease, and cause the valve to throttle the flow of liquid.

In the present embodiment of the invention coil 75 is thermally affected coordinately with the changes in temperature of the air discharged from the interchanger and the coil 78 is disposed adjacent the windshield 24. The coil 75 is disposed adjacent the air discharge of the radiator 41. The tube 72 extends upwardly from the coil 75 and through an opening in the plate 37 and through the panel 33. The coil 78 is mounted on a bracket 79, which bracket comprises a base 80 of insulation material and two opposite uprights 81. The base 80 is secured to the ledge 35 adjacent the central portion of the windshield.

A cover or shield 82 is secured over the coil 78, which cover has openings 83 on either side through which air may freely circulate over the coil. The cover 82 is formed with lugs 84 that extend through openings in panel 33, which lugs turn outwardly to frictionally hold the cover in position. The shield 82 prevents radiant heat entering the windshield from affecting the temperature of the coil 78.

The coil 78 is located adjacent the winshield 24 so that air chilled by contact with the windshield will flow downwardly and affect the temperature of the coil. Preferably the coil 78 is also intermediate the outlets of the ducts 57 so that the coil will not be appreciably affected by the air discharged against the windshield. The glass forming the windshield readily assumes substantially the temperature of the outside air so that the temperature of the air descending over the coil will change as the temperature of the outside air changes. Also the coil 78 will be thermally affected by the warm air of the interior of the enclosure as it rises above the panel 33. The rising air is mingled with the cool air descending from the windshield so that the temperature of the coil 78 will be the mean temperature of the warm and cool air.

The bellows 71 is mounted in a casing 86, attached to the valve frame. A pin 87 is attached to an end wall of the bellows and engages a lever for actuating the valve. The structure of this valve is similar to that disclosed in the application of E. D. Raney and W. V. Hobbs, referred to above. The valve is moved to decrease or stop the flow of liquid in response to an increase in pressure within the thermostatic system 70 and moved to permit or increase the flow of liquid in response to a decrease in pressure within the thermostatic system.

The valve mechanism may be adjusted by a knob 85 that extends through the shroud 50 and into the compartment. Preferably the valve mechanism is adjusted so that when the coolest part of the thermostatic system 70 rises to 74 degrees F., for example, the valve will be completely closed to stop of flow of liquid through the radiator 41. It is well known that in a vapor filled thermostatic system, such as that disclosed herein, the pressure in the system is determined by the vapor pressure at the coolest part of the system and a temperature of part of the system considerably above the temperature of the coolest part of the system will have no effect on the pressure in the system. Consequently when any portion of the thermostatic system 70 falls below 74 degrees, the attendant decrease in pressure in the thermostatic system causes the bellows to collapse and open the valve for admitting liquid to the radiator 41.

In operation, as the automobile moves forwardly, air is forcefully directed into the compartment through the opening 26 and through the radiator 41. The inflowing air creates a pressure inside the passenger compartment and flows to all parts of the compartment. As long as the air discharging from the radiator 41 is above 74 degrees and the air surrounding the coil 78 is above 74 degrees, the valve will remain closed. When the temperature of the air discharged from radiator 41 decreases below 74 degrees the coil 75 is immediately and directly affected by the temperature of this air and vapor in the system 70 commences to condense in this coil causing the valve to be opened to permit warm liquid to circulate through the radiator 41. This occurs regardless of whether or not the temperature of the coil 78 is above 74 degrees F. When the circulating liquid warms the radiator 41 and air passing therethrough the coil 75 will be warmed above 74 degrees. However, the valve will remain open as long as the temperature of the coil 78 is below 74 degrees. As the temperature of the outside air decreases the temperature of the air descending from the windshield over the coil 78 deceases, causing the valve to permit an increased volume of liquid to circulate through the radiator 41. Thus a comfortable temperature will be maintained in the compartment 12. Also an increase in outside air temperature will cause the temperature of the air around the coil 78 to be increased and cause throttling of the valve.

Quite often it is desirable to provide a radio between the air duct 29 and the panel 33. Referring to Fig. 1, a radio 100 is shown in position between air inlet duct and panel 33. This radio is positioned at the center of the panel and directly beneath the coil 78. When the radio is operated for any considerable time the heat generated thereby is likely to influence the thermostatic element which comprises the coil 78. In order to prevent the heat of the radio from affecting the thermostatic control of the valve, cool air is circulated through the radio. Openings 101 are formed in the radio casing 102 adjacent the air inlet duct 29 and openings 103 are formed in one wall of the air inlet duct in alignment with the openings 101. A gasket 104 is interposed between the radio casing and the air inlet duct for forming a connection between the duct and the radio casing to carry away heat generated by the radio. Air enters the radio casing 102 through the openings 101 and 103 and passes from the casing through openings for the control knobs of the radio, one of which is shown at 105. Thus the heat generated by the radio is dissipated by the air.

While the form of embodiment of the present invention as herein disclosed constitutes a preferred form, it is to be understood that other forms might be adopted, all coming within the scope of the claims which follow.

I claim:

1. In combination, an automobile having a closable passenger compartment, said compartment having an air inlet and a transparent windshield; a heater for the passenger compartment disposed to heat the air entering the inlet before the air enters the compartment; control mechanism for changing the rate of heat exchange between the heater and the air; and means for regulating the control mechanism, said means including a temperature responsive element disposed remotely from the heater and adjacent said windshield so that said element is in the path of cold air descending from the windshield and also affected by the temperature of the air inside the compartment.

2. In combination, an automobile having a closable passenger compartment, said compartment having an air inlet and a windshield; a heater for the passenger compartment disposed to heat the air entering the inlet before the air enters the compartment; ducts having spaced outlets adjacent the windshield for directing air over the windshield; control mechanism for changing the rate of heat exchange between the heater and the air; and means for regulating the control mechanism, said means including a temperature responsive element disposed between the outlets and adjacent the windshield.

3. In combination, an automobile having a closable passenger compartment, said compartment having an air inlet, a windshield, an instrument panel, a ledge extending forwardly from the panel to the windshield; a heater for the passenger compartment disposed to heat the air entering the inlet before the air enters the compartment; control mechanism for changing the rate of heat exchange between the heater and the air; and means for regulating the control mechanism, said means including a temperature responsive element carried on said ledge and adjacent the windshield.

4. In combination, an automobile having a closable passenger compartment, said compartment having an air inlet, a windshield, an instrument panel, a ledge extending forwardly from the panel to the windshield, a device such as a radio adapted to generate heat and disposed in front of the panel and below the ledge; a heat interchanger interposed between the air inlet and the compartment; means forming a passage for conducting air, entering the inlet, about said device for cooling the same; control mechanism for changing the rate of heat exchange between the heat interchanger and the air; and means for regulating the control mechanism, said means including a temperature responsive element carried on said ledge adjacent the windshield.

5. In combination, an automobile having a closed passenger compartment having an air inlet, said compartment including an outside wall section, the temperature of which wall section changes with changes in the temperature of air outside the compartment; a heating system for the compartment including a heat exchanger associated with the air inlet for heating the air flowing through the inlet; and means for controlling the temperature of the heat exchanger including a valve, a pressure responsive expansible device for actuating the valve, a tube communicating with the device, said tube and device containing a volatile fluid, a portion of said tube being disposed to be affected by the air which is intimately subjugated to changes in temperature of the exchanger and another portion of the tube being disposed near said wall section so that it is affected by air cooled by said section and also by the temperature of air on the interior of the compartment, the volume of fluid in the tube being such that the fluid is partly vapor and partly liquid and that liquid is retainable in the colder of the two portions during normal operating temperatures of the system whereby the pressure responsive device is responsive solely to the colder of said two portions.

6. In combination, an automobile having a closed passenger compartment having an air inlet, and a transparent windshield; a heating system for the compartment including a heat exchanger associated with the air inlet for heating the air flowing through the inlet; and means for controlling the temperature of the heat exchanger including a valve, a pressure responsive expansible device for actuating the valve, a tube communicating with the device, said tube and device containing a volatile fluid, a portion of said tube being disposed to be affected by the air which is intimately subjugated to changes in temperature of the exchanger and another portion of the tube being disposed near the windshield so that it is affected by air cooled by said windshield and also by the temperature of air on the interior of the compartment, the volume of fluid in the tube being such that the fluid is partly vapor and partly liquid and that liquid is retainable in the colder of the two portions during normal operating temperatures of the system whereby the pressure responsive device is responsive solely to the colder of said two portions.

7. In combination, an automobile having a closable passenger compartment, said compartment having an air inlet, a windshield, an instrument panel, a ledge extending forwardly from the panel to the windshield, a device such as a radio adapted to generate heat and disposed in front of the panel and below the ledge; a heat interchanger interposed between the air inlet and the compartment; means forming a passage for conducting air, entering the inlet, about said device for cooling the same; control mechanism for changing the rate of heat exchange between the heat interchanger and the air; and means for regulating the control mechanism, said means including a valve, a pressure responsive expansible device for actuating the valve, a tube communicating with the device, said tube and device containing a volatile fluid, a portion of said tube being affected by the air which is intimately subjugated to changes in temperature of the exchanger and another portion of the tube being carried on said ledge adjacent the windshield, the volume of fluid in the tube being such that the fluid is partly vapor and partly liquid and that liquid is retainable in the colder of the two portions during normal operating temperatures of the system whereby the pressure responsive device is responsive solely to the colder of said two portions.

ESTEL C. RANEY.